United States Patent
Iwasaki

(10) Patent No.: US 7,059,436 B2
(45) Date of Patent: Jun. 13, 2006

(54) OPERATING LOAD CONTROL FOR FUEL CELL POWER SYSTEM IN FUEL CELL VEHICLE

(75) Inventor: Yasukazu Iwasaki, Yokosuka (JP)

(73) Assignee: Nissan Motor Co., Ltd., Yokohama (JP)

(*) Notice: Subject to any disclaimer, the term of this patent is extended or adjusted under 35 U.S.C. 154(b) by 383 days.

(21) Appl. No.: 10/069,499

(22) PCT Filed: Oct. 9, 2001

(86) PCT No.: PCT/JP01/08855

§ 371 (c)(1),
(2), (4) Date: Feb. 27, 2002

(87) PCT Pub. No.: WO02/36385

PCT Pub. Date: May 10, 2002

(65) Prior Publication Data

US 2002/0162694 A1    Nov. 7, 2002

(30) Foreign Application Priority Data

Oct. 31, 2000  (JP) ............................. 2000-332946

(51) Int. Cl.
*B60L 11/18* (2006.01)

(52) U.S. Cl. .................. 180/65.3; 429/23; 320/104; 701/22

(58) Field of Classification Search ............... 180/65.1, 180/65.2, 65.3, 65.8; 429/23; 320/104; 701/22

See application file for complete search history.

(56) References Cited

U.S. PATENT DOCUMENTS

| | | | |
|---|---|---|---|
| 4,740,534 A | | 4/1988 | Matsuda et al. |
| 4,961,151 A | * | 10/1990 | Early et al. ................. 700/297 |
| 4,994,542 A | | 2/1991 | Matsuda et al. |
| 5,154,986 A | * | 10/1992 | Takechi et al. ............... 429/23 |
| 5,173,301 A | | 12/1992 | Itoh et al. |
| 5,482,790 A | * | 1/1996 | Yamada et al. ................ 429/9 |
| 5,631,532 A | * | 5/1997 | Azuma et al. .............. 320/102 |
| 5,646,852 A | * | 7/1997 | Lorenz et al. .............. 701/103 |

(Continued)

FOREIGN PATENT DOCUMENTS

EP    0 993 060    4/2000

(Continued)

OTHER PUBLICATIONS

Nadal et al., "Development of a Hybrid Fuel Cell/Battery Powered Electric Vehicle," International Journal of Hydrogen Energy, vol. 21, No. 6, (1996), pp. 497-505.

*Primary Examiner*—Jeff Restifo
(74) *Attorney, Agent, or Firm*—Foley & Lardner LLP

(57) ABSTRACT

A fuel cell vehicle drives a motor (9) with electric power from a fuel cell power system (100) comprising a fuel cell (4) which generates electricity using hydrogen and oxygen. A controller (10) calculates an electrical load demand required to run the vehicle. When this value is below a predetermined load, it performs constant load operation of the fuel cell power system (100), and when the predetermined load value is exceeded, it operates it under a load according to the electrical load demand. The demand for resolution and precision of the various sensors or flowrate control valves installed in the fuel cell power system and thereby suppressed, costs can be reduced, and fuel cost-performance is improved by continuing an efficient operating state.

17 Claims, 14 Drawing Sheets

U.S. PATENT DOCUMENTS

| | | | | |
|---|---|---|---|---|
| 5,714,874 A | * | 2/1998 | Bonnefoy | 323/299 |
| 5,808,448 A | * | 9/1998 | Naito | 322/13 |
| 5,820,172 A | * | 10/1998 | Brigham et al. | 290/40 C |
| 6,116,368 A | * | 9/2000 | Lyons et al. | 180/165 |
| 6,158,537 A | * | 12/2000 | Nonobe | 180/65.3 |
| 6,255,008 B1 | * | 7/2001 | Iwase | 429/9 |
| 6,518,732 B1 | * | 2/2003 | Palanisamy | 320/147 |
| 6,520,273 B1 | * | 2/2003 | Ishikawa | 180/65.3 |
| 6,651,759 B1 | * | 11/2003 | Gruenwald et al. | 180/65.2 |
| 6,656,618 B1 | * | 12/2003 | Iwase | 429/23 |
| 6,777,909 B1 | * | 8/2004 | Aberle et al. | 320/104 |

FOREIGN PATENT DOCUMENTS

| | | |
|---|---|---|
| EP | 1 086 847 | 3/2001 |
| JP | 4-51466 | 2/1992 |
| JP | 5-151983 A | 6/1993 |
| JP | 9-7618 | 1/1997 |
| JP | 10-292857 A | 11/1998 |
| JP | 2000-012059 A | 1/2000 |
| JP | 2001-339810 A | 12/2001 |

* cited by examiner

OPERATING LOAD CONTROL FOR FUEL CELL POWER SYSTEM IN FUEL CELL VEHICLE

FIELD OF THE INVENTION

This invention relates to operating load control of a fuel cell power system in a fuel cell vehicle.

BACKGROUND OF THE INVENTION

In a fuel cell power systems for fuel cell vehicles, the electrical load may vary rapidly with time by as much as 0–100%, which is a major difference from fixed type fuel cell power plants. Although it is required to make the operating load of a fuel cell power system follow the electrical load in order that the fuel cell power system supplies electric power without any excess or deficiency, it is difficult to make the operating load of the fuel cell power system follow the electrical load. In JP-A-H4-51466 published by the Japanese Patent Office in 1996, a battery is connected to the output side of the fuel cell to compensate the delay of the fuel cell power system. When the electrical load exceeds the output of the fuel cell, the insufficiency is compensated by the battery, and when the electrical load is less than the output of the fuel cell, the excess power is stored in the battery.

SUMMARY OF THE INVENTION

However, in such a system, as a high capacity battery is needed, the cost will become high, and the operating time at the maximum rated load will be limited by the battery capacity. Further, as the size of the battery is large, it is inconvenient for mounting on a vehicle.

JP-A-H9-7618 published by the Japanese Patent Office in 1997 suppresses the capacity of the battery, and has solved the problem that the battery capacity in the above-mentioned JP-A-H4-51466 is large by determining the operating load of the fuel cell power system based on the average of the electrical load.

However, under such control, the fuel cell power system is usually operated more often in a low efficiency range with the normal vehicle running pattern, and fuel consumption is impaired as mentioned later. Further, to comply with a broad electrical load of 0–100%, fast response, high precision, a high resolution sensor and flowrate control valves are required, cost is high and advanced control is also needed.

It is therefore an object of this invention to operate a fuel cell power system at high efficiency in a fuel cell vehicle wherein the electrical load varies broadly between 0–100%, and to improve the fuel cost-performance of a fuel cell vehicle. It is another object to lower the response precision required of sensors and flowrate control valves in a fuel cell power system, and lower cost.

In order to achieve above object, this invention provides a fuel cell vehicle, comprising a fuel cell power system which generates power using hydrogen and oxygen, a motor for a vehicle drive which runs by receiving the power supplied from the fuel cell power system, and a controller functioning to compute an electrical load demand required for running the vehicle, operate the fuel cell power system under a constant load regardless of the electrical load demand, when the electrical load demand is smaller than a predetermined load, and operate the fuel cell power system under a load according to the electrical load demand, when the electrical load demand is larger than the predetermined load.

The details as well as other features and advantages of this invention are set forth in the remainder of the specification and are shown in the accompanying drawings.

DESCRIPTION OF THE PREFERRED EMBODIMENTS

Figure 1:
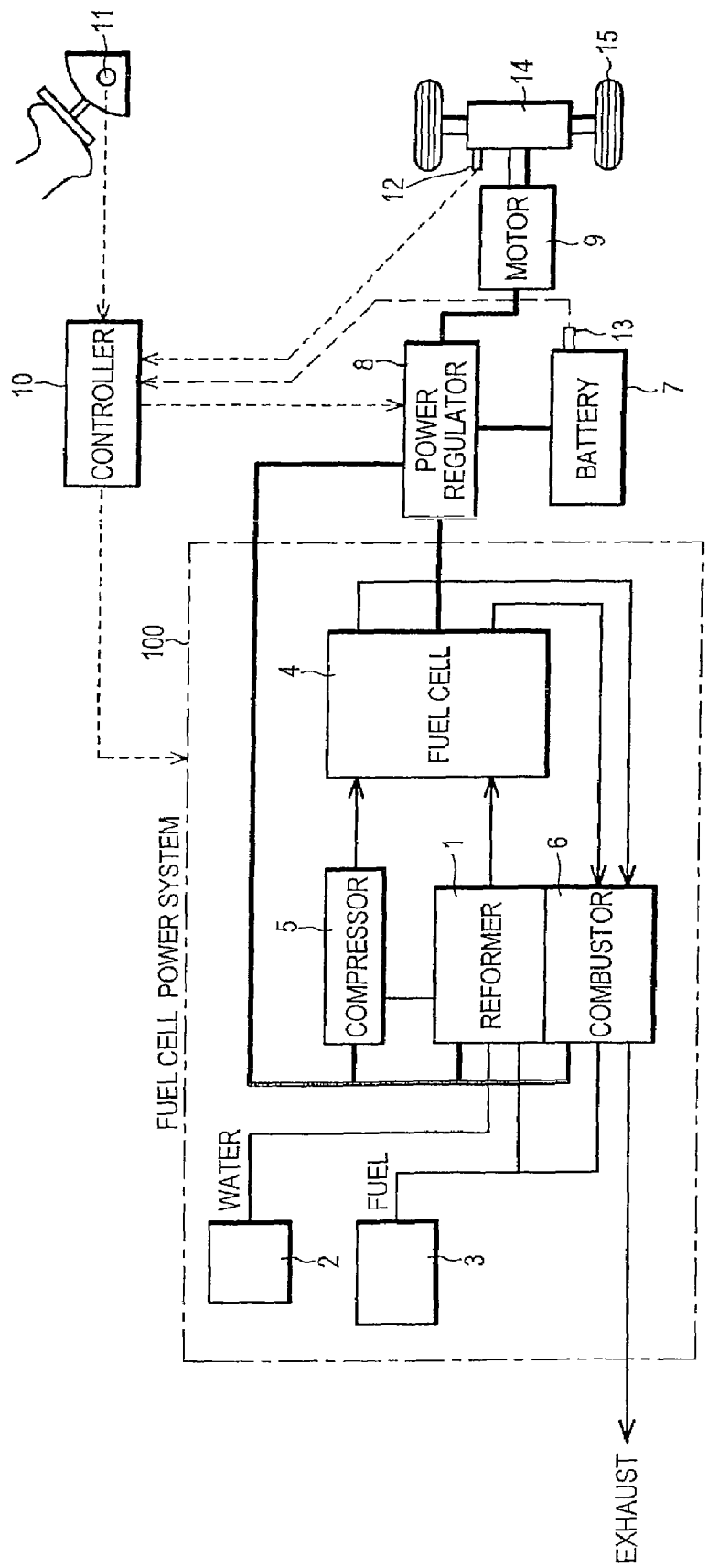
FIG. 1 is a schematic diagram of a fuel cell vehicle according to this invention.

Referring to FIG. 1 of the drawings, FIG. 1 shows the construction of a fuel cell vehicle relating to this invention. A fuel cell power system 100 surrounded by a dot-and-dash line in the diagram comprises a reformer 1, water tank 2, fuel tank 3, fuel cell 4 and compressor 5.

Water and methanol are supplied to the reformer 1 from the water tank 2 and fuel tank 3, respectively, and the reformer 1 generates reformate gas containing hydrogen from steam reforming. Steam reforming is an endothermic reaction. The reformate gas is supplied to the anode of the fuel cell 4. Hydrocarbon fuels other than methanol, for example, gasoline, may also be used as a fuel.

If the reforming catalyst filling the reformer 1 has not reached activation temperature, for example immediately after system start-up, air as an oxidizing agent is supplied to the reformer 1 from the compressor 5, and reforming by partial oxidation of methanol is also performed. As the partial oxidation reaction is an exothermic reaction, the reforming catalyst can be heated by the heat of reaction.

Air from the compressor 5 is supplied to the cathode of the fuel cell 4. The fuel cell 4 generates electricity using the hydrogen in the reformate gas, and the oxygen in air. The excess hydrogen and excess oxygen which are not used for power generation are burnt in a combustor 6. Air is supplied to the combustor 6 from the compressor 5 if needed.

This heat of combustion is used for vaporizing methanol and water which are supplied to the reformer 1, or compensating heat absorption during steam reforming in the reformer 1. The gas after combustion is discharged in atmospheric air as exhaust gas.

A battery 7 is connected to the fuel cell 4 via a power regulator 8. The battery 7 stores excess electrical power in the electrical power generated by the fuel cell 4, and stores regenerated power from the motor 9 when the vehicle decelerates. This control is performed by the power regulator 8. When the power consumed by the motor 9 for running the vehicle, or the power consumed by the reformer 1, compressor 5 and combustor 6 is not generated by the fuel cell 4, the battery 7 discharges to compensate the power deficiency. An SOC sensor 13 which detects the state of charge (SOC) is attached to the battery 7. The SOC sensor 13 detects the SOC based on the potential difference between the I/O terminals of the battery 7.

A controller 10 comprises one or more microprocessors, a memory, and an I/O interface. The controller 10 computes the required power based on an accelerator depression amount sensor 11 which detects the depression amount of the accelerator pedal, and a vehicle speed sensor 12. The controller 10 controls the power distribution of the power regulator 8 while controlling the fuel cell power system 100, based on the signal from the SOC sensor 13. The motor 9 is driven by the power supply from the fuel cell 4 and battery 7, and drives drive wheels 15 through a reduction gear device 14.

Figure 2:
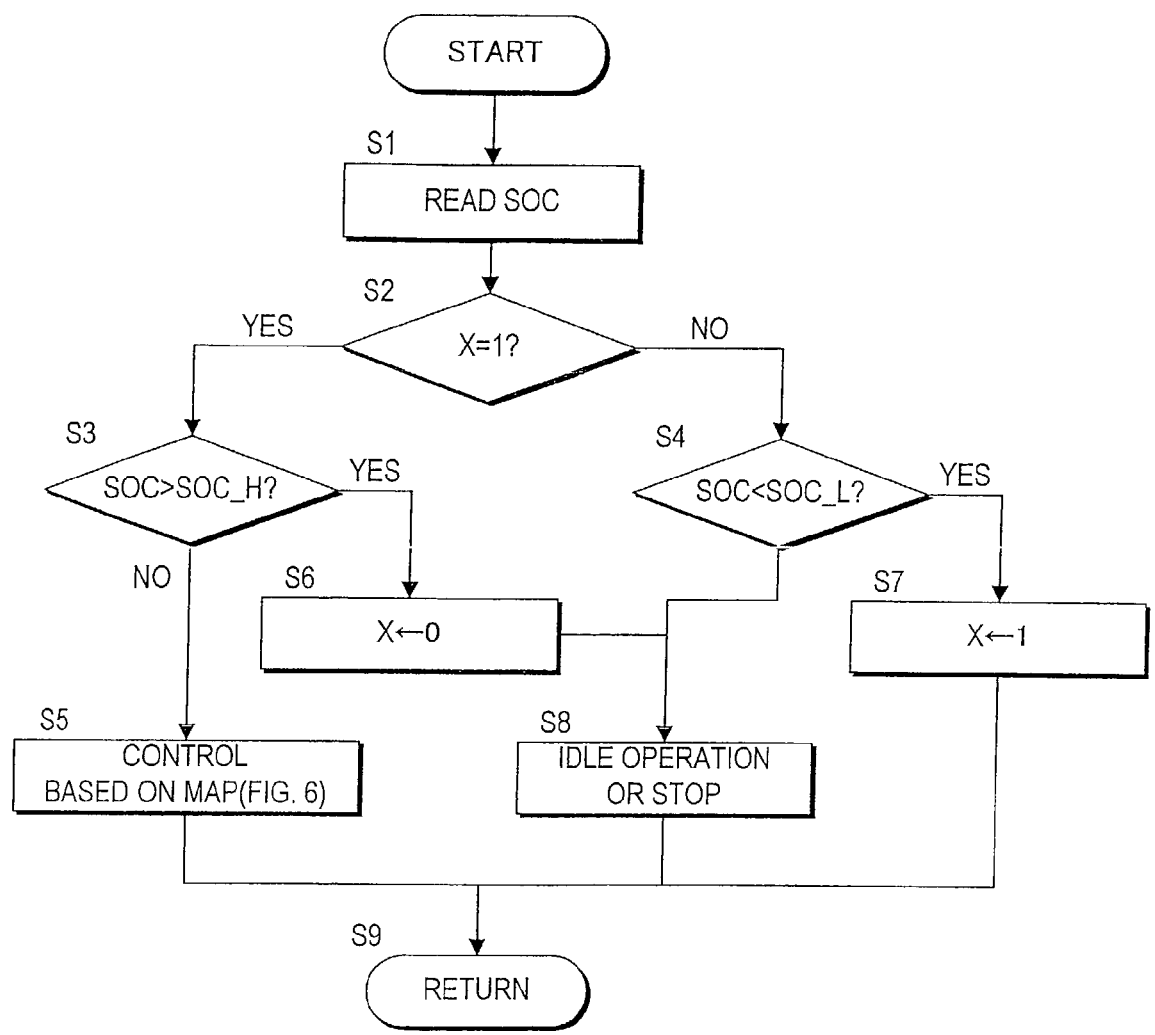
FIG. 2 is a flowchart which shows processing when a controller controls a fuel cell power system.

FIG. 2 is a flowchart which shows processing when the controller 10 controls the fuel cell power system 100.

Firstly, in a step S1, the charge state SOC of the battery 7 detected by the SOC sensor 13 is read.

In a step S2, a flag X for determining the SOC stored in the memory of the controller 10 is determined. When the flag X is "1", the routine proceeds to a step S3, and when the flag X is "0", the routine proceeds to a step S4.

In the step S3, it is determined whether or not the SOC is larger than an upper limit SOC_H. If the SOC in the fully charged state is set to 1.0, SOC_H is set to 0.8. When SOC is below SOC_H, the routine proceeds to a step S5, and when it is large, the routine proceeds to a step S6.

Figure 3:
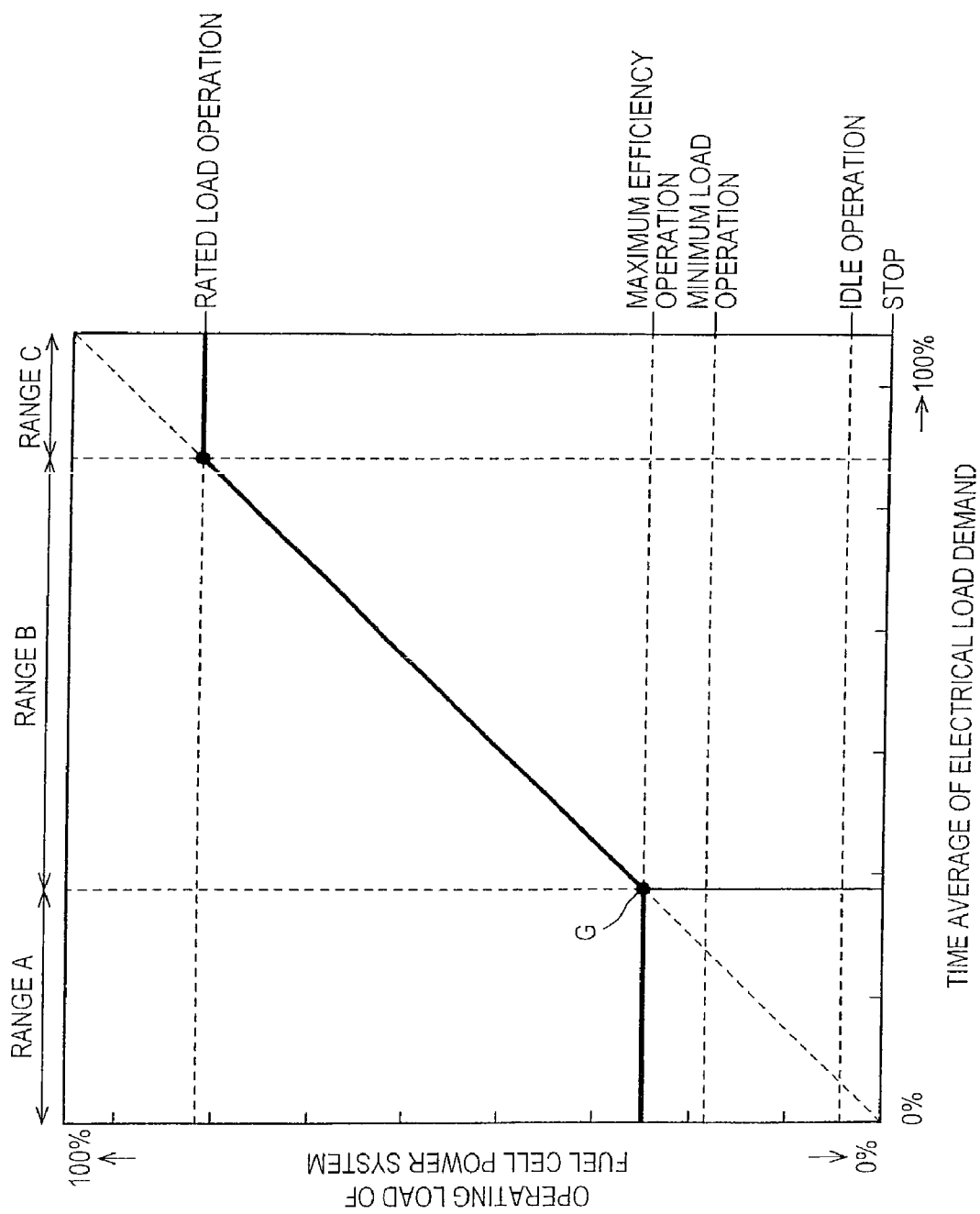
FIG. 3 is a map which defines the operating load of the fuel cell power system based on the time average of an electrical load demand.
Figure 4:
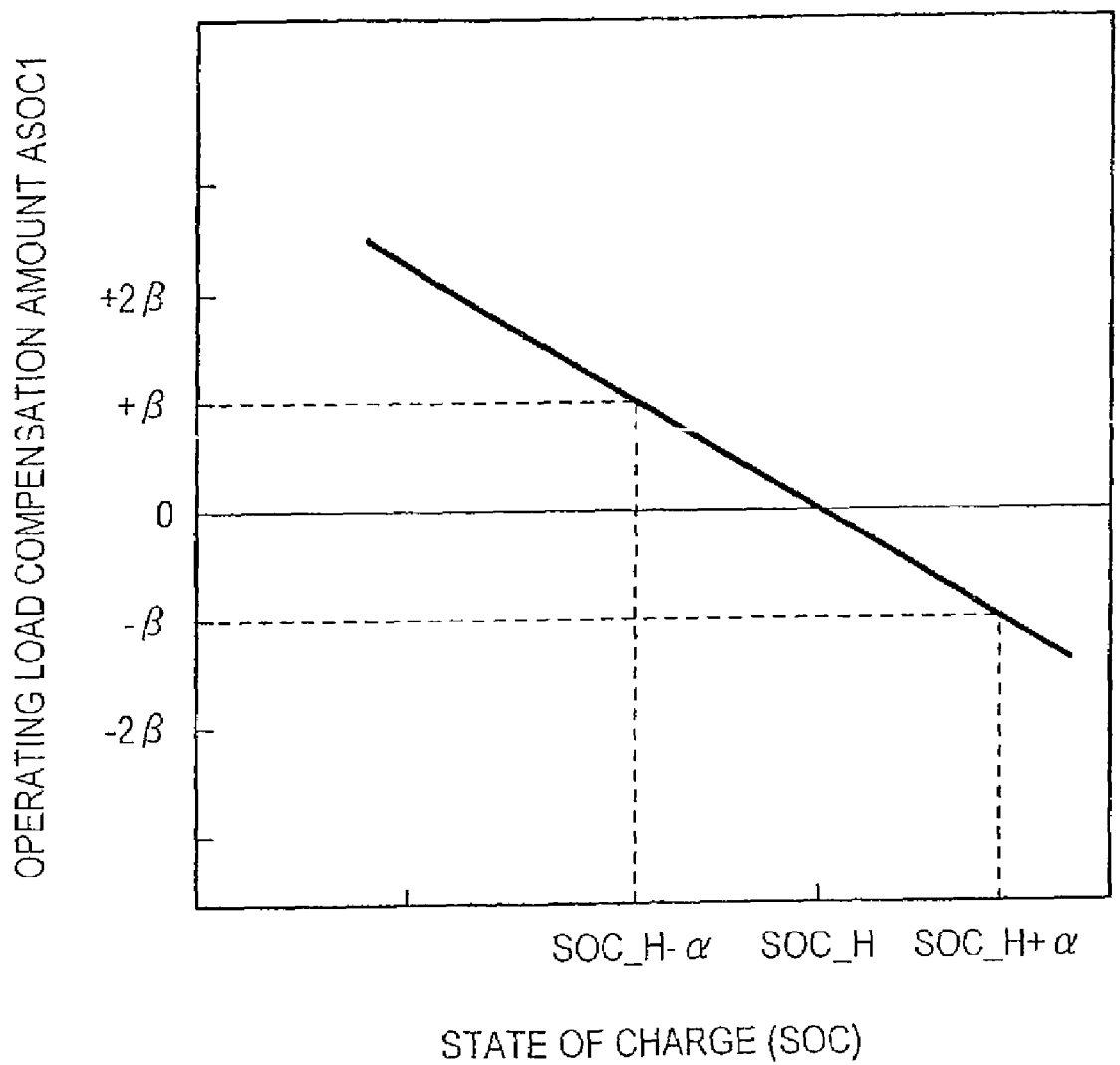
FIG. 4 is a map for compensating the operating load of the fuel cell power system according to the charge state of a battery.
Figure 5:
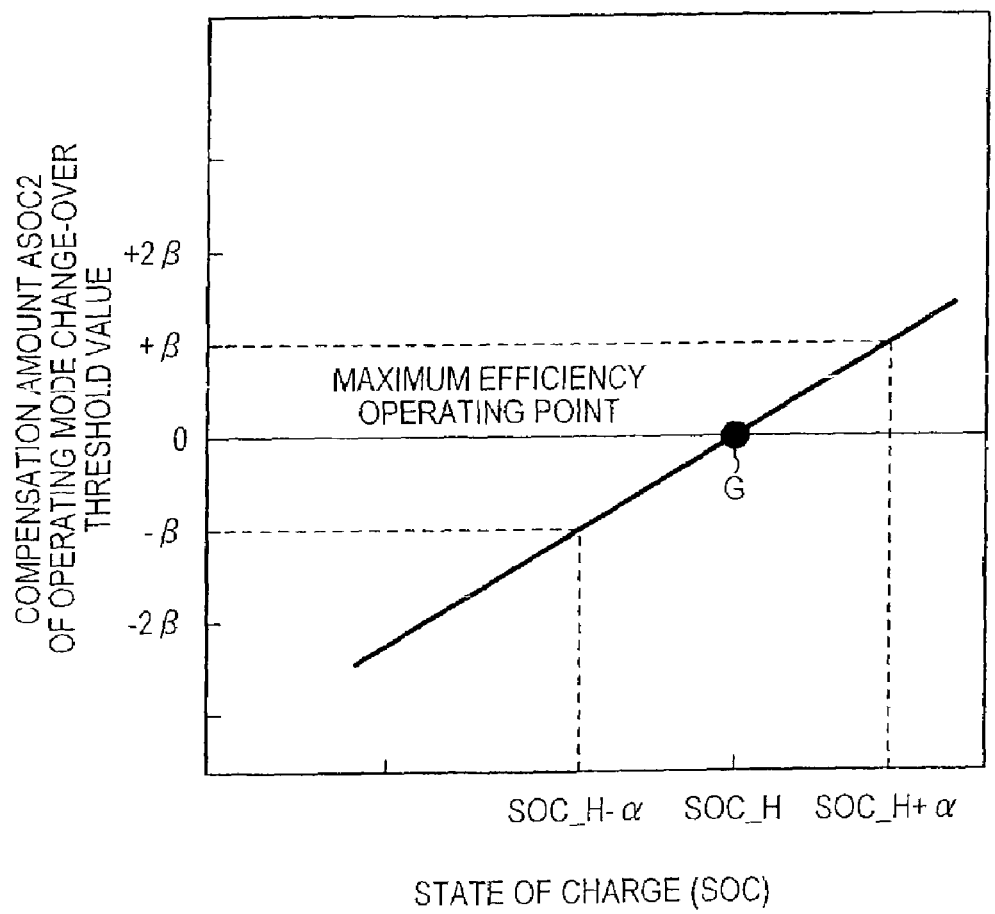
FIG. 5 is a map for compensating an operating mode change-over threshold value according to the charge state of the battery.
Figure 6:
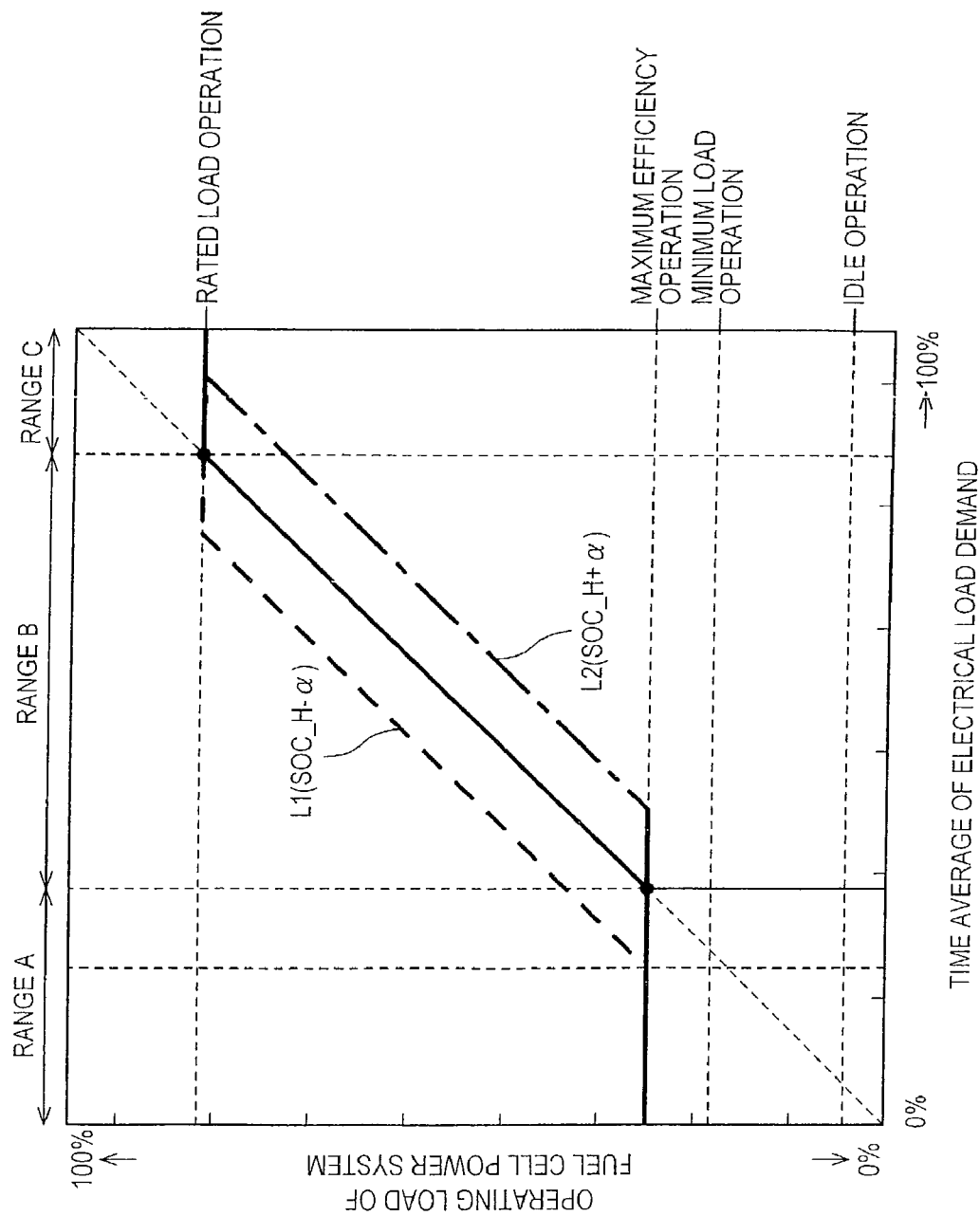
FIG. 6 is a map which defines the operating load of the fuel cell power system based on the time average of the electrical load demand, wherein this map shows how compensation is performed according to a charge state of the battery.

In the step S5, referring to the map shown in FIG. 6 which is made by adding a compensation amount according to the SOC of FIG. 4 and FIG. 5 to the map of FIG. 3, the fuel cell power system 100 is controlled by the operating load determined according to the time average of the electrical load demand (described in detail hereafter), and the routine proceeds to a step S9.

When the SOC is larger than the upper limit SOC_H, "0" is stored in the flag X in the step S6, and the routine proceeds to a step S8.

When the flag X is "0" in the step S2, the routine proceeds to the step S4, and it is determined whether or not the SOC is smaller than a lower limit SOC_L. If the SOC in the fully charged state is set to 1.0, SOC_L is set to 0.6. When the SOC is smaller than the lower limit SOC_L, the routine proceeds to the step S7, and when it is larger than the lower limit SOC_L, the routine proceeds to the step S8.

In the step S7, "1" is stored in the flag X and the routine proceeds to the step S9.

In the step S8, idle operation is performed or the fuel cell power system 100 is stopped, and the routine proceeds to the step S9. The stop of the fuel cell power system 100 simply means that the system is stopped, and the temperature of each part falls gradually by heat dissipation loss of the fuel cell power system 100. Idle operation means a state where the power generated by the fuel cell 4 and the power consumption of the compressor 5, etc., are balanced, or a state for maintaining a hot standby state to the extent that the temperatures of the reformer 1 and the evaporator, not shown, which vaporizes the fuel, do not fall too much.

In the step S9, the routine returns to the start.

The above-mentioned control prevents the fuel cell power system 100 from frequently changing over between idle operation or stop and re-operation, and impairment of system efficiency due to repeat of stop and re-operation is suppressed. When the SOC reaches the upper limit SOC_H overcharge of the battery 7 can be prevented by changing over the operating state of the fuel cell power system 100 to the idle operation state or stop state.

Next, the map shown in FIG. 3 will be described. According to the map shown in FIG. 3, the operating load of the fuel cell power system 100 is determined basically according to the time average of the electrical load demand.

The range A in the figure is a range in which the time average of the electrical load demand is less than the load corresponding to the maximum efficiency operating point of the fuel cell power system 100. In the range A, if the SOC of the battery 7 is lower than the upper limit SOC_H, the fuel cell power system 100 is operated under a predetermined load corresponding to the maximum efficiency operating point regardless of electrical load demand, and if it is larger than the upper limit, the fuel cell power system 100 is run idle or stopped.

The range B is a range which makes the time average of the electrical load demand the operating load of the fuel cell power system 100. That is, the operating load of the fuel cell power system 100 is controlled to follow the time average of the electrical load demand. Thereby, the system efficiency when operating under high load can be particularly improved. Moreover, as the sensors and flowrate control valves need only correspond to a load range above the predetermined load corresponding to the maximum efficiency operating point and below a rated load, the demand for response can be lowered and cost can be reduced.

The range C is a range where the time average of electrical load demand exceeds the rated load of the fuel cell power system 100. In the range C, the fuel cell power system 100 operates at the rated load, and insufficient electric power is always compensated by the battery 7. Therefore, if the design is such that the maximum rating of the motor 9 is less than the rating of the fuel cell power system 100, the range C does not exist.

Therefore, the range between the minimum load operation (identical or slightly less than the maximum efficiency operating point) of the fuel cell power system 100, and idle operation or stop, is the load range to which the fuel cell power system 100 does not need to correspond. As the fuel cell power system 100 does not need to be a fuel cell system with a big turndown ratio, the demand for response of sensors or flowrate control valves can be suppressed, and costs can be lowered. Here, the turndown ratio is the ratio of the rating of the fuel cell power system and the actual operating load. For example, when the minimum load operation is 20% relative to the rating of 100%, the maximum turndown ratio is 5, and when the maximum rotation speed of the engine is 8000 rpm and the idle rotation speed is 800 rpm, the maximum turndown ratio is 10.

Although in FIG. 3, the operating load of the fuel cell power system 100 is determined according to the time average of electrical load demand, the operating load of the fuel cell power system 100 may be determined according to the instantaneous value of electrical load demand.

FIG. 4 is a map for compensating the operating load of the fuel cell power system 100 in the range B of FIG. 3 according to the SOC. According to this map, the operating load is not compensated if the SOC is the upper limit SOC_H. An operating load compensation amount ASOC1 is increased on the positive side when the SOC is decreased from the upper limit SOC_H, and part of the excess power generation amount is used for charging the battery 7. On the other hand, the operating load compensation amount ASOC1 is increased on the negative side, therefore a compensation is made to reduce the operating load and excess power generation is suppressed, when the SOC is increased from the upper limit SOC_H.

FIG. 5 is a map for compensating a threshold value (point G in the figure) for changing over between the operating mode of range A and range B of FIG. 3, according to the SOC of the battery 7.

According to this map, if the SOC is the upper limit SOC_H, the operating mode change-over point G is not compensated. A compensation amount ASOC2 is made smaller, when the SOC is decreased from the upper limit SOC_H, and the operating mode change-over point G is compensated in a direction in which the time average of the electrical load demand becomes small. The compensation amount ASOC2 is increased, when the SOC is increased from the upper limit SOC_H, and the operating mode switching point G is compensated in a direction in which the time average of the electrical load demand becomes large.

Due to this compensation, even if a situation continues such that the time average of the electrical load demand is equivalent to or slightly less than the predetermined load, the battery 7 is promptly charged, and sufficient SOC can be ensured when the vehicle is keyed off (when operation is terminated). That is, if the change-over point G of FIG. 3 is the maximum efficiency point G (for example, 20% load), then the operating mode range change-over threshold value fluctuates in a range adjacent to this.

FIG. 6 is a map in which a compensation according to the SOC of FIG. 4 and FIG. 5 is added to the map of FIG. 3. In the flowchart shown in FIG. 2, the operating load of the fuel cell power system 100 is determined based on the map of FIG. 6.

For example, for SOC_H−α when the SOC of the battery 7 is a little smaller than the upper limit SOC_H, the relation between the time average of electrical load demand and the operating load of the fuel cell power system 100 moves on the broken line L1. For SOC_H+α when the SOC is larger than the upper limit SOC_H, the relation between the time average of electrical load demand and the operating load of the fuel cell power system 100 moves on the dot-and-dash line L2.

Figure 7:
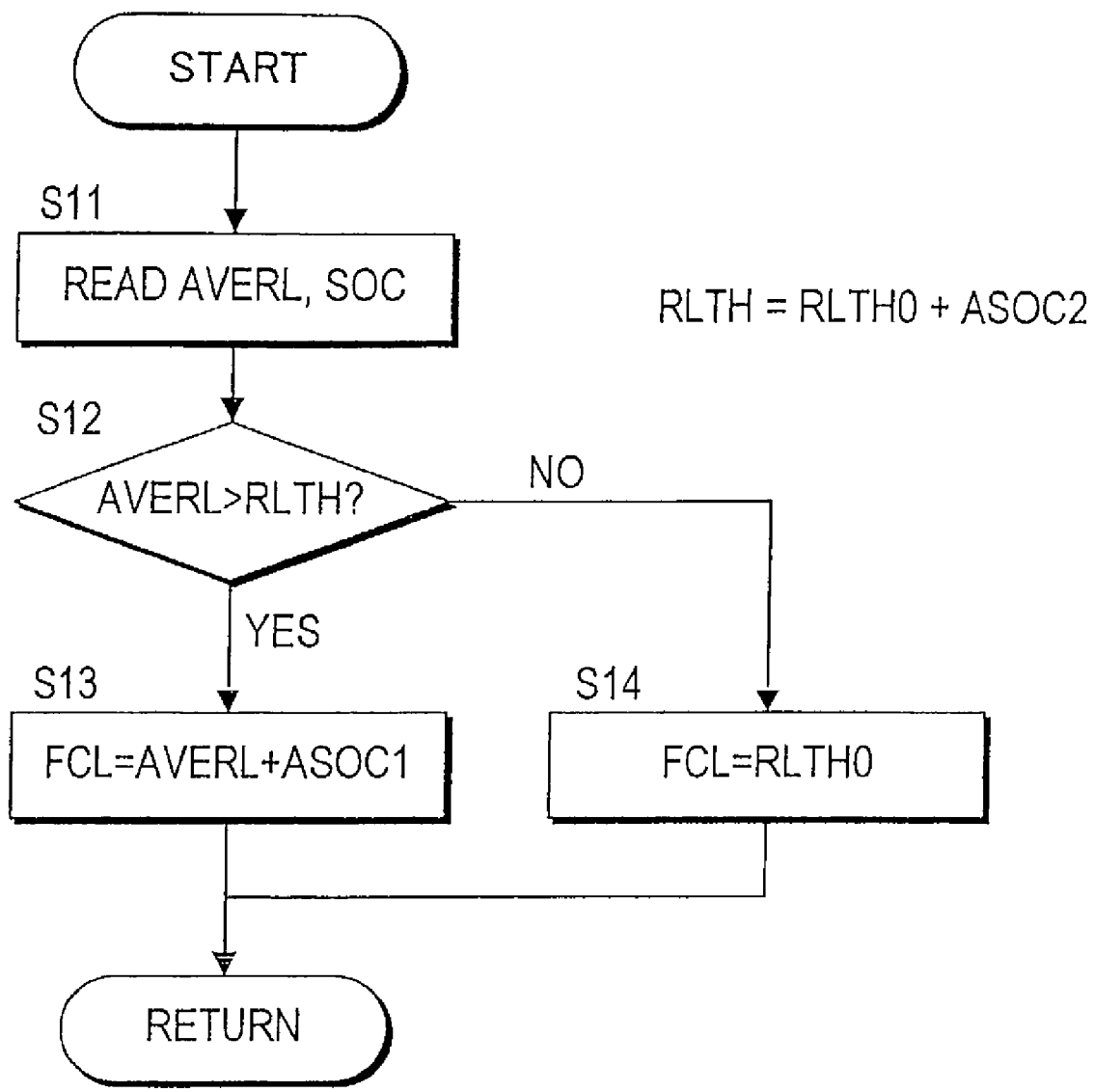
FIG. 7 is a flowchart showing the processing which defines the operating load of the fuel cell power system based on the time average of the electrical load demand.

Although the operating load of the fuel cell power system 100 is determined referring to the map shown in FIG. 6 in the processing shown in FIG. 2 (step S5), the subroutine shown in FIG. 7 may be executed and the operating load determined.

First, in a step S11, a time average AVERL of the electrical load demand and the charge state SOC of a battery 7 is read.

In a step S12, it is determined whether or not AVERL is larger than an operating mode change-over threshold value RLTH. The operating mode change-over threshold value RLTH is a value obtained by compensating a predetermined load RLTH0 (for example, 20%) by the compensation amount ASOC2 according to the charge state SOC, and is calculated by the following equation (1):

$$RLTH = RLTH0 + ASOC2 \quad (1)$$

The compensation amount ASOC2 is determined referring to the map shown in FIG. 5.

In a step S12, when AVERL is larger than the running mode threshold value RLTH, the routine proceeds to a step S13, and the operating load FCL of the fuel cell power system 100 is determined according to the electrical load demand. In this embodiment, the electrical load demand is computed based on the output signal of the accelerator depression amount sensor 11 and the vehicle speed sensor 12, and the time average AVERL of the electrical load demand is compensated by the compensation amount ASOC1 according to the charge state SOC to determine the operating load FCL. The operating load FCL is calculated by the following equation (2):

$$FCL = AVERL + ASOC1 \quad (2)$$

The compensation amount ASOC1 is determined referring to the map shown in FIG. 4. When AVERL is smaller than the operating mode threshold value RLTH, the routine proceeds to a step S14, the operating load FCL of the fuel cell power system 100 is set to the predetermined load RLTH0, and the fuel cell power system 100 is operated under the predetermined load RLTH0.

Even if the subroutine shown in FIG. 7 is processed, the same effect as the above is obtained.

Next, the effect of this invention will be described, referring to FIG. 8 to FIG. 14.

Figure 8:
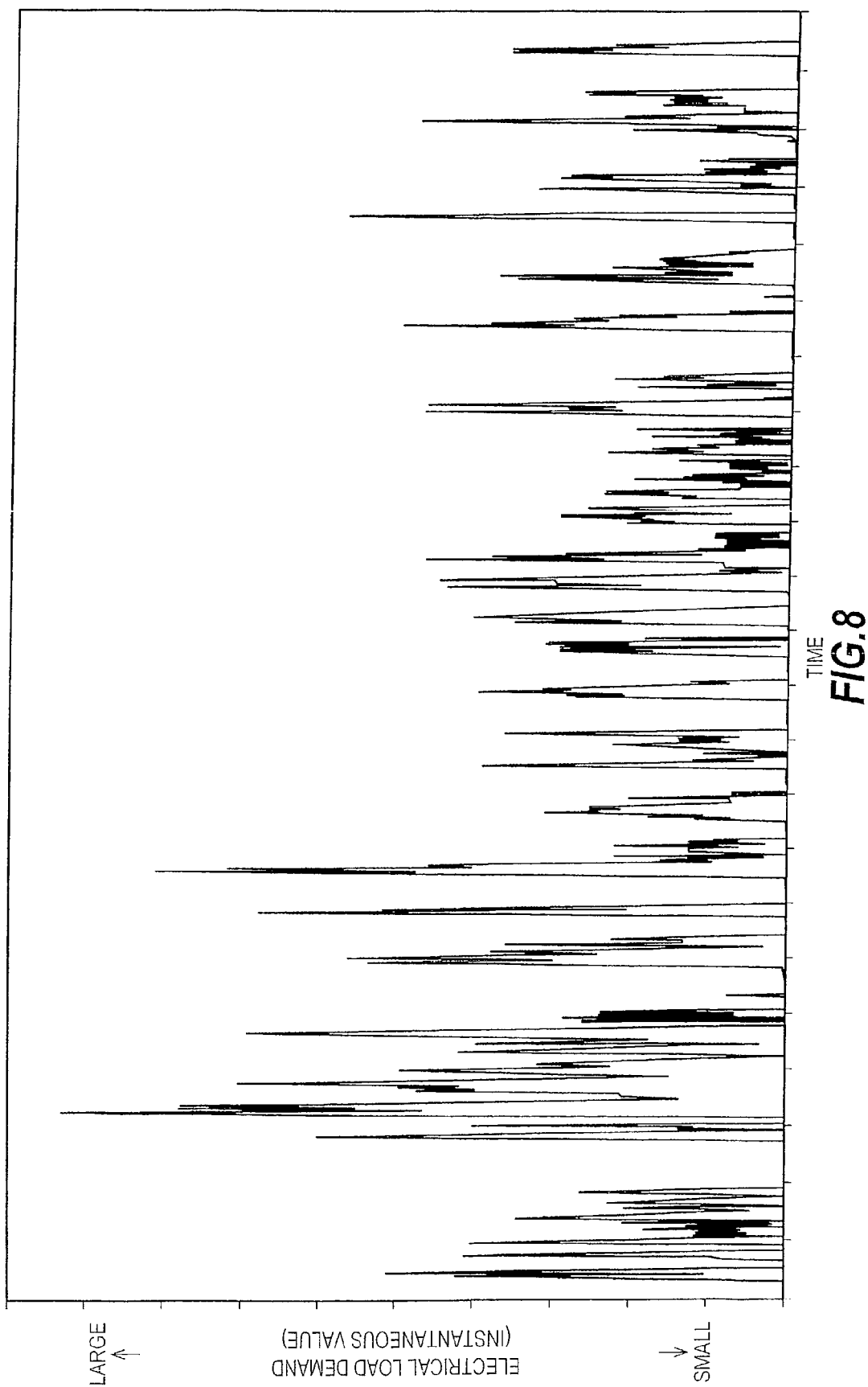
FIG. 8 is a time chart which shows the change of an instantaneous value of the electrical load demand when the fuel cell vehicle runs in a normal running pattern.

FIG. 8 shows an example of the electrical load demand when the fuel cell vehicle runs in a normal running pattern. Here, the running load is regarded as the electrical load demand.

Figure 9:
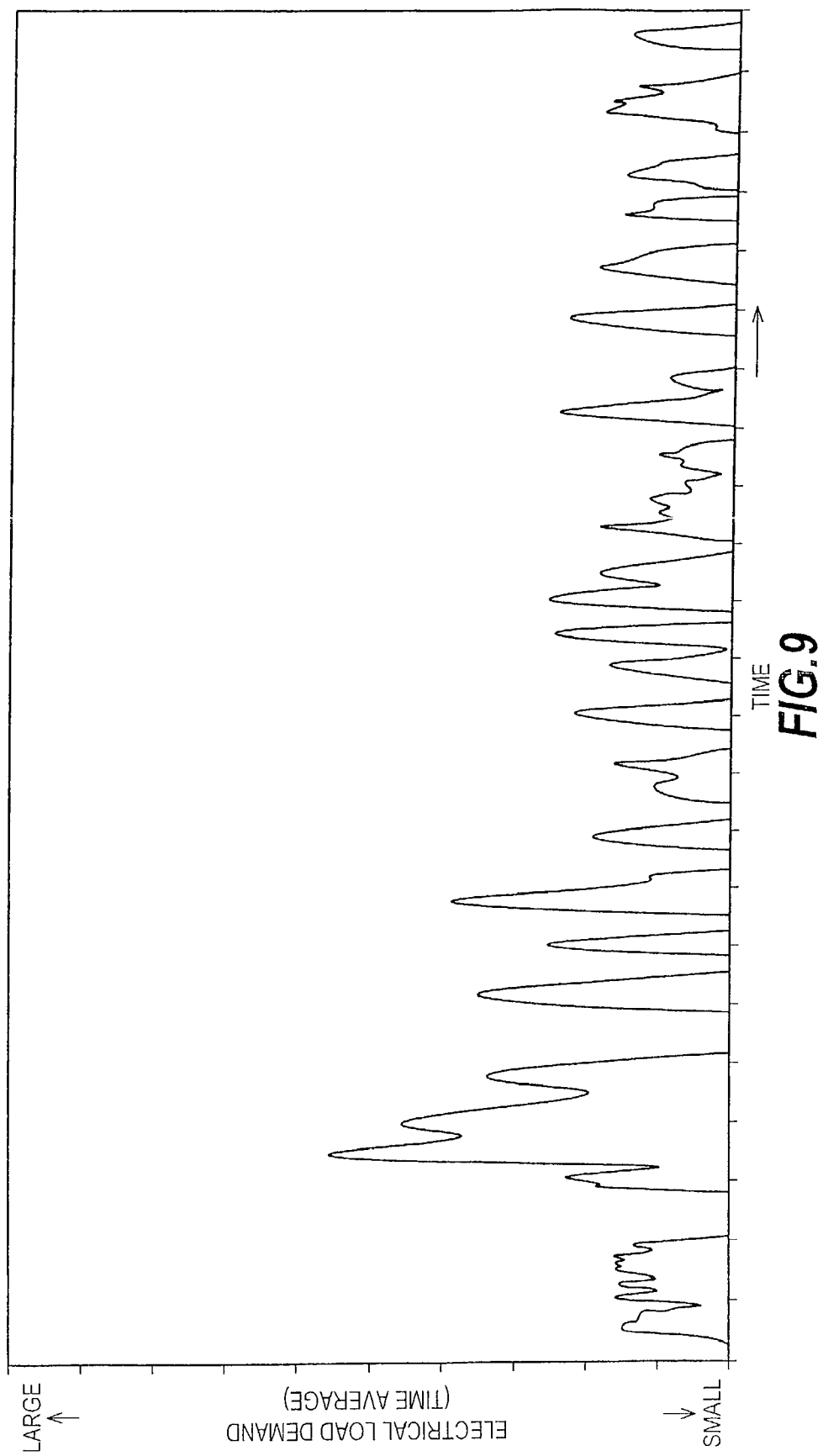
FIG. 9 is a time chart which shows the change of a time average of the electrical load demand when the fuel cell vehicle runs in a normal running pattern.

The average value in the predetermined time of FIG. 8 (average of the electrical load demand for the past 20 seconds, at that instant), is shown in FIG. 9. Here, it is desirable that the time average of the electrical load demand is the average of the electrical load demand in a time interval shorter than the startup time of the fuel cell power system 100. If the time to compute the average is made shorter than the starting time of the fuel cell system 100, the operating load at the time of startup of the fuel cell system can be determined by the time startup of the fuel cell is complete.

Figure 10:
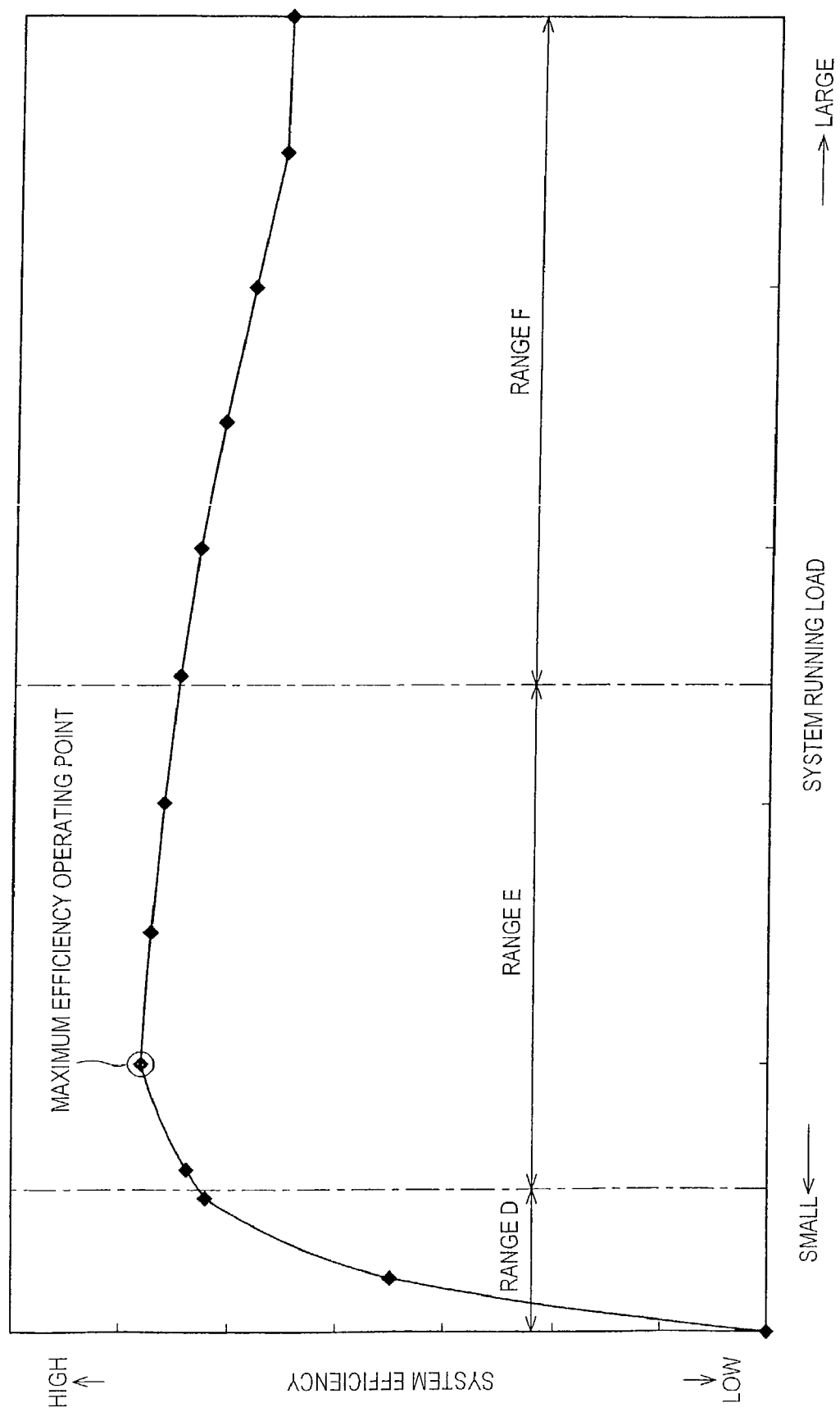
FIG. 10 is a characteristic diagram showing the relation between the operating load of the fuel cell power system, and system efficiency.

FIG. 10 shows the relation between the operating load of the fuel cell power system 100, and system efficiency.

In a range D in the figure, although the efficiency of the fuel cell 4 itself is high, system efficiency will fall due to efficiency decrease of the air supply system, or efficiency decrease of the reformer 1.

In a range F, system efficiency will fall due to efficiency decrease of the fuel cell 4 itself, and efficiency decrease of the air supply system by having raised the operating pressure in order to operate the fuel cell 4 under high load.

Range E is a range between ranges D and F, and is a range where the system efficiency is high including maximum efficiency operation. The compensation of the operating mode change-over threshold value according to the SOC shown in FIG. 5 (the point G in FIG. 5), is set so that the operating mode change-over threshold value RLTH is in the range E.

Figure 11:
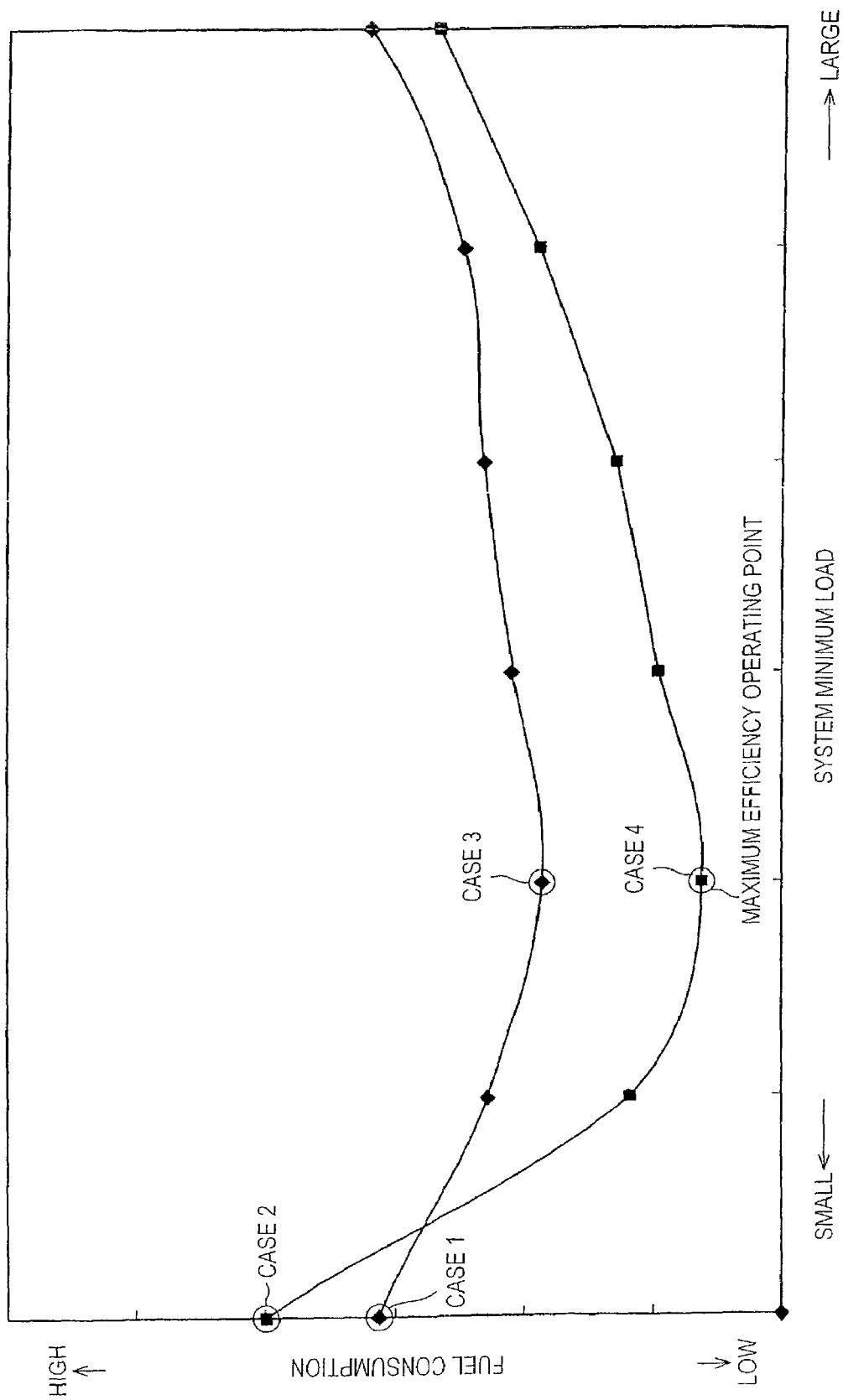
FIG. 11 is a characteristic diagram showing the relation between the system minimum load and fuel consumption.

The fuel consumption when the fuel cell vehicle runs in the normal running pattern shown in FIG. 8, is shown in FIG. 11. It is assumed that the fuel cell power system 100 has the characteristics shown in FIG. 10. The horizontal axis of FIG. 11 is the minimum value of the load range covered by the fuel cell power system 100 (system minimum load), and corresponds to the minimum load operation of FIG. 3. When the fuel cell power system 100 covers the full load range of 0–100% load, the system minimum load becomes 0%, and when it covers 20–100% load, the system minimum load becomes 20%. Hereafter, different cases of the operation of the fuel cell power system 100 will be described.

Case 1 shows fuel consumption when the response, resolution and precision of sensors and flowrate control valves of the fuel cell power system 100 are increased, and the fuel cell power system 100 is operated so as to follow the instantaneous value of electrical load demand shown in FIG. 8 in the full load region.

Case 2 shows the fuel consumption when the fuel cell power system 100 is operated so as to follow the time average of the electrical load demand shown in FIG. 9 in the full load region. In this case, high resolution and precision of sensors and flowrate control valves are required, but the demand for high response can be reduced. The reason why fuel consumption is worse than in Case 1 is that during normal running, the electrical load corresponding to the range D of FIG. 10 is frequently required, and the fuel cell power system is frequently operated under a load with even poorer efficiency by taking the time average of the electrical load demand.

Case 3 shows the fuel consumption when the operating load of the fuel cell power system 100 is limited to the range B of FIG. 3, and the fuel cell power system 100 is operated so as to follow the instantaneous value of the electrical load demand only in Range B. Compared with cases 1 and 2, fuel consumption decreases (fuel cost-performance improves), and the optimal fuel consumption is obtained at the point where the minimum load of the system is equal to the maximum efficiency operating point of the system. As the fuel cell power system 100 need only correspond to a load range of system minimum load–100% load, a system having a small turndown ratio of about five may be used, high resolution or precision of sensors or flowrate control valves is not required, and the cost of the system is held down.

Case 4 shows fuel consumption when the operating load of the fuel cell power system 100 is limited to the range B of FIG. 3, and the fuel cell power system 100 is operated so as to follow the time average of the electrical load demand only in the range B. In case 4, fuel consumption decreases further than in case 3. Here, optimal fuel consumption is obtained at the point where the minimum load of the system is equal to the maximum efficiency operating point of the system as in case 3, therefore a system having a small turndown ratio of about five may be used, and high resolution or precision of sensors or flowrate control valves are not required. Further, the demand for response can be made lower than in case 3.

Figure 12:
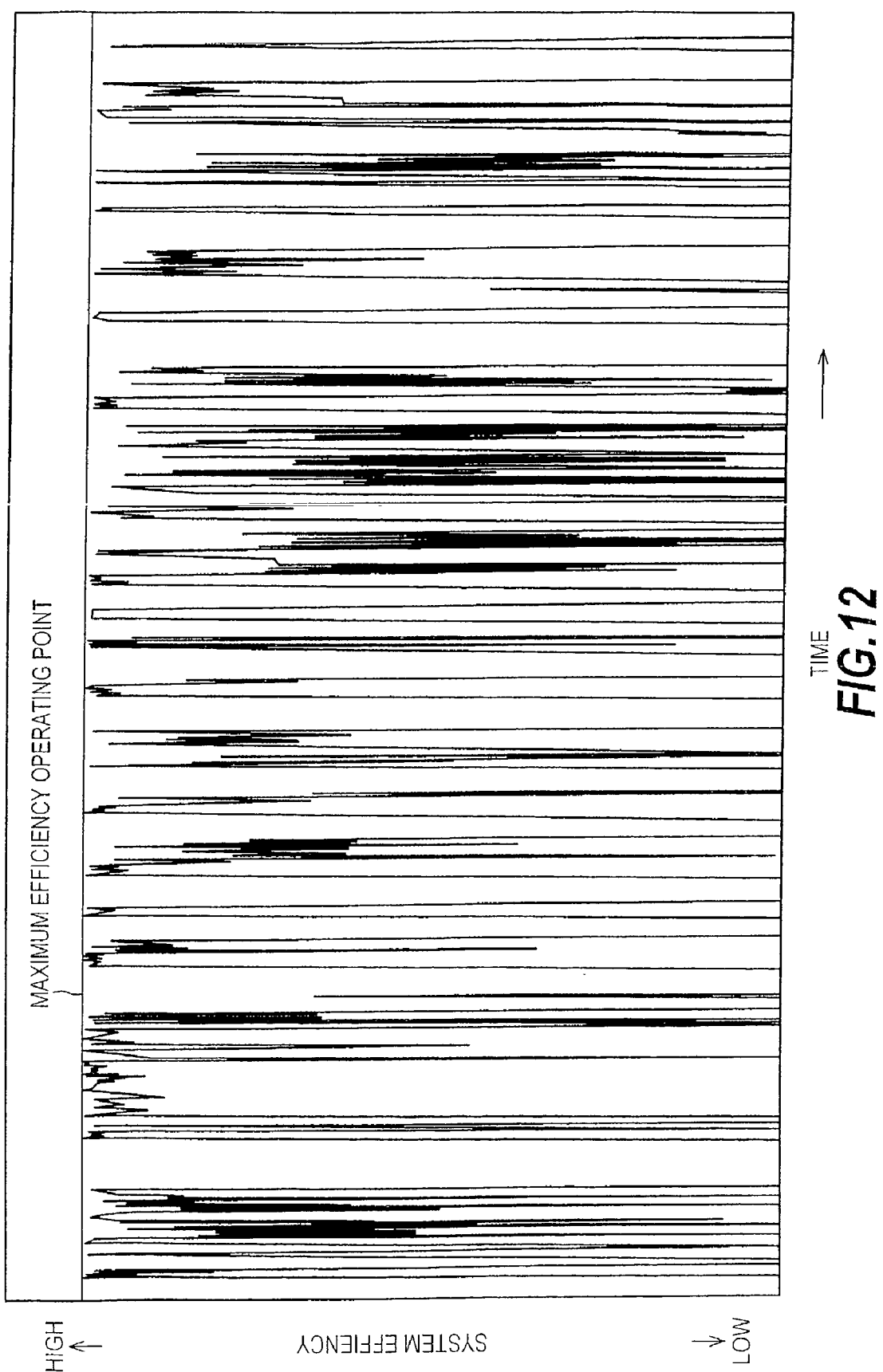
FIG. 12 is a time chart showing the variation of the efficiency of the fuel cell power system when this invention is not applied.
Figure 13:
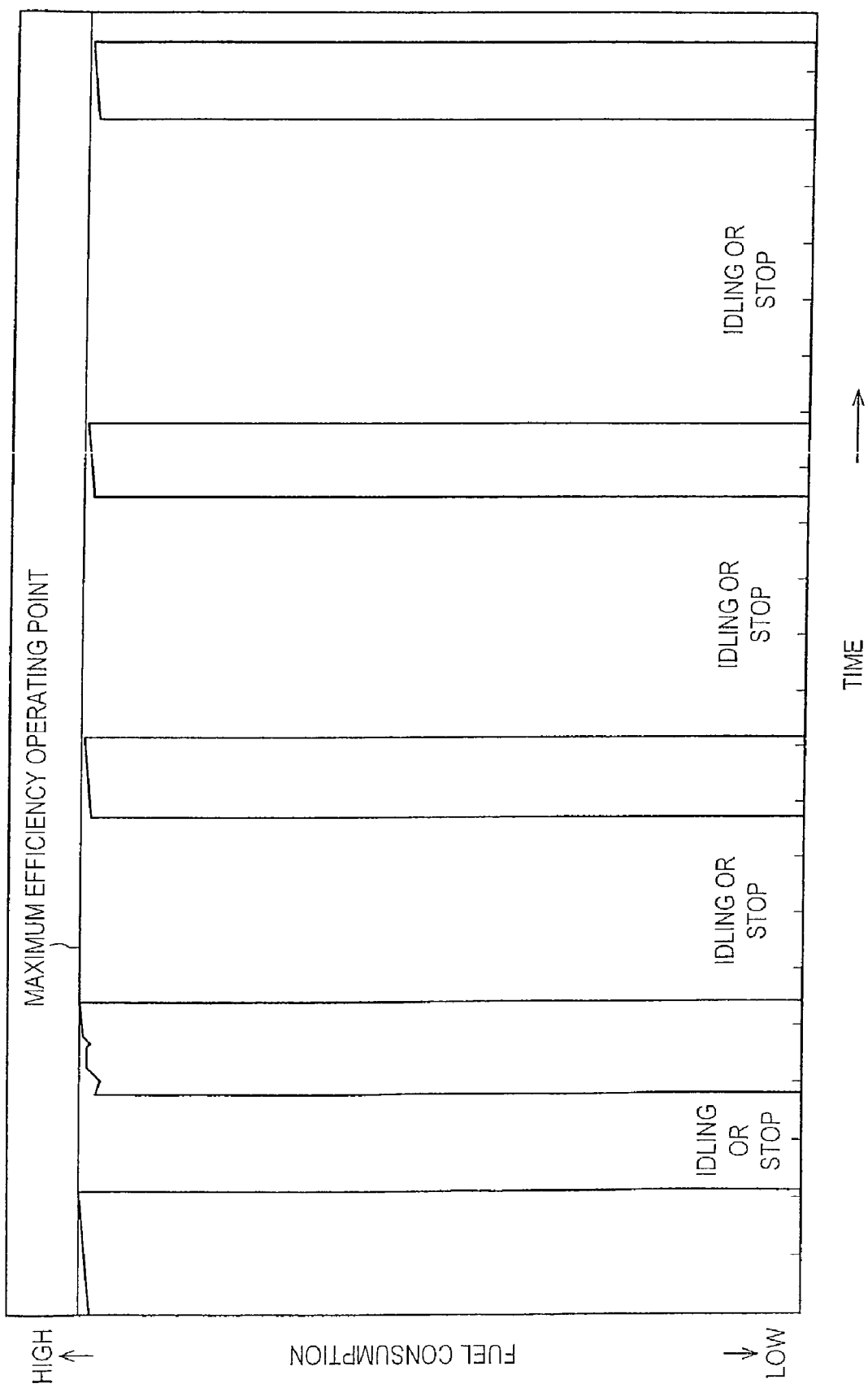
FIG. 13 is a time chart showing the variation of the efficiency of the fuel cell power system when this invention is applied.

The variation of system efficiency in case 1 (when this invention is not applied) and case 4 (when this invention is applied), is shown in FIG. 12 and FIG. 13, respectively.

In FIG. 12, it is seen that the system is often operated in a range with poor efficiency using a fuel cell system having a large turndown ratio, high resolution and high precision. On the other hand, in FIG. 13, it is seen that the system is operated only near the maximum efficiency point using a fuel cell power system having a small turndown ratio, wherein the resolution and precision are not so high. Therefore, according to this invention, a fuel cell vehicle with low fuel consumption can be realized using an inexpensive fuel cell power system and an inexpensive battery.

Figure 14:
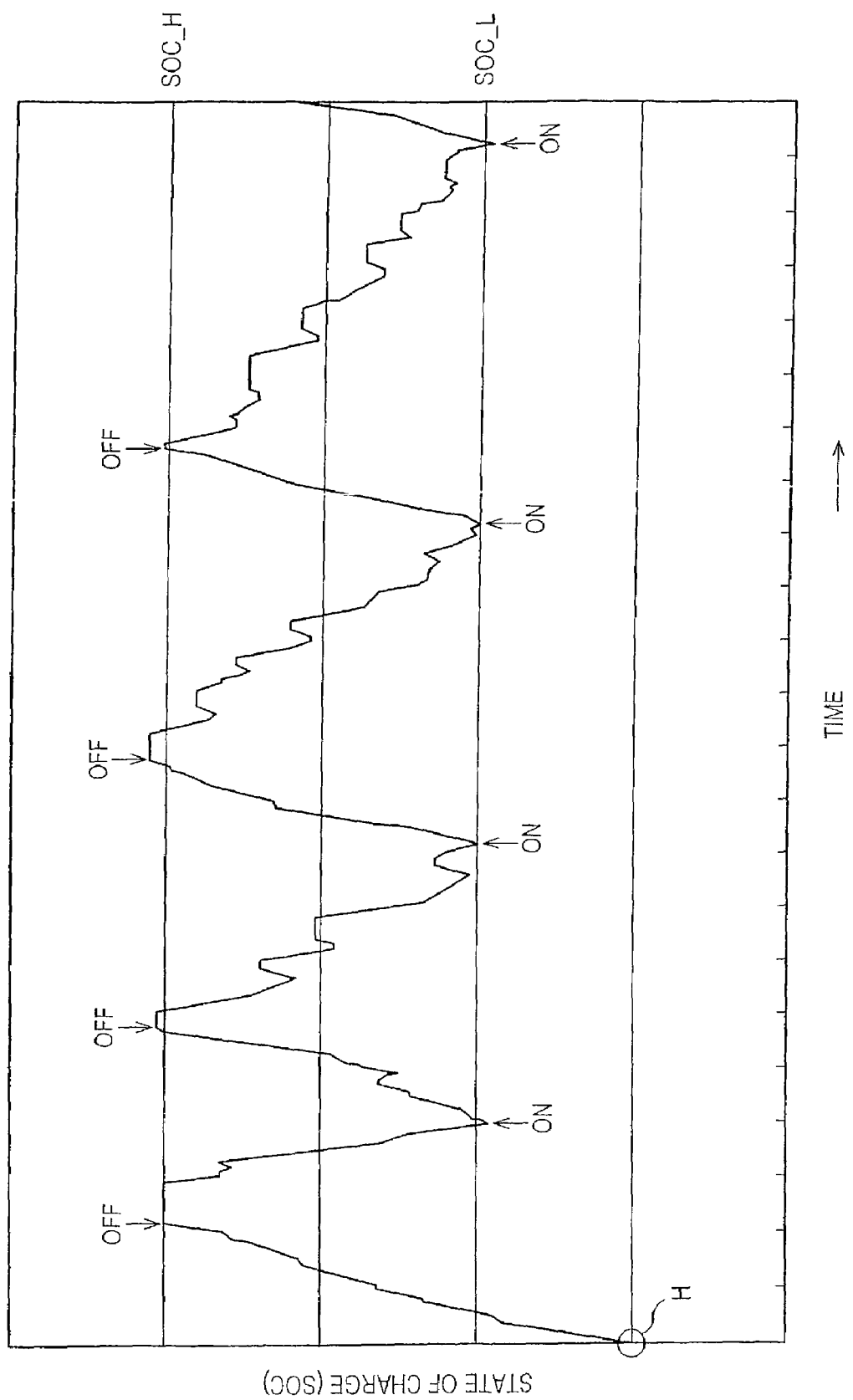
FIG. 14 is a time chart showing the variation of the charge state of the battery when this invention is applied.

FIG. 14 shows the variation of the SOC in case 4.

The point H in the figure is the point where the SOC has fallen due to provision by the battery of power required to start the fuel cell power system 100 on startup of the fuel cell power system 100, and the power required for running. Moreover, at the part where the SOC is over the SOC_H, the battery 7 was charged with the power regenerated by the motor 9. In the figure, "OFF" means that the SOC has reached the upper limit SOC_H and operation of the fuel cell power system 100 has stopped. "ON" means that the SOC has reached the lower limit SOC_L, and the operation at the predetermined load has started. If the SOC on full charge is one, SOC_H will be set to 0.8 and SOC_L will be set to 0.6, respectively, for example.

This invention is not limited to the embodiment described so far. For example, in the above-mentioned embodiment, although smoothing of the electrical load is performed by taking a time average, smoothing may be performed by other methods, e.g., using, for example, a filter which has a delay time constant. Even if the operating load of the fuel cell power system 100 is controlled according to an electrical load which is smoothed by another smoothing method, the same effect as the above embodiment is obtained.

Although the above-mentioned fuel cell power system 100 is provided with a reformer, this invention may also be applied to a system which has a hydrogen storage device instead of a reformer, wherein hydrogen is supplied to the fuel cell from the hydrogen storage device. The fuel cell power system may be operated based not on the electrical load demand, but on the load value actually consumed. Also, in the above-mentioned embodiment, running load was considered as electrical load, but in addition to running load, auxiliary power such as air conditioners may be included. This is because a difference of this level can be absorbed by the battery.

The entire contents of Japanese Patent Application P2000-332946 (filed Oct. 4, 2000) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

INDUSTRIAL FIELD OF APPLICATION

In a fuel cell vehicle wherein an electrical load varies broadly between 0–100%, this invention is useful to operate the fuel cell power system at high efficiency and improves the fuel cost-performance of the fuel cell vehicle. It is also useful to reduce the response and precision which are required of sensors and flowrate control valves, and thereby lower the cost, in a fuel cell power system.

The invention claimed is:

1. A fuel cell vehicle, comprising:
   a fuel cell power system which generates power using hydrogen and oxygen;
   a motor for a vehicle drive which runs by receiving the power supplied from the fuel cell power system; and
   a controller functioning to:
   compute an electrical load demand required for running the vehicle, operate the fuel cell power system under a constant load regardless of the electrical load demand, when the electrical load demand is smaller than a predetermined load, the predetermined load corresponding to the constant load and the constant load being larger than a load in an idle operation, and operate the fuel cell power system under a load according to the electrical load demand, when the electrical load demand is larger than the predetermined load.

2. The fuel cell vehicle as defined in claim 1, wherein:
the electrical load demand is an instantaneous value of an electrical load required for running the vehicle.

3. The fuel cell vehicle as defined in claim 1, wherein:
the electrical load demand is a time average of an electrical load required for running the vehicle.

4. The fuel cell vehicle as defined in claim 3, wherein the time average of the electrical load demand is the average of the electrical load demand in a time interval shorter than the startup time of the fuel cell power system.

5. The fuel cell vehicle as defined in claim 1, wherein:
steady state operation under the predetermined load is included in the constant load operation.

6. The fuel cell vehicle as defined in claim 5, further comprising:
a battery which stores the power generated by the fuel cell power system and
a sensor which detects a charge state of the battery, wherein
the controller further functions to change over the operating state of the fuel cell power system from the steady state operation to the idle operation state, when the charge state of the battery reaches an predetermined upper limit.

7. The fuel cell vehicle as defined in claim 5, further comprising:
a battery which stores the power generated by the fuel cell power system, and
a sensor which detects a charge state of the battery, wherein
the controller further functions to change over the operating state of the fuel cell power system from the steady state operation to the stop state, when the charge state of the battery reaches a predetermined upper limit.

8. The fuel cell vehicle as defined in claim 1, wherein:
idle operation is included in the constant load operation.

9. The fuel cell vehicle as defined in claim 1, wherein the predetermined load is a load corresponding to the maximum efficiency operating point of the fuel cell power system.

10. The fuel cell vehicle as defined in claim 1, wherein the controller further functions to:
continuously operate the fuel cell power system so that the operating load of the fuel cell power system is the electrical load demand, when the electrical load demand is larger than the predetermined load.

11. The fuel cell vehicle as defined in claim 1, further comprising:
a battery which stores the power generated by the fuel cell power system, and
a sensor which detects a charge state of the battery, wherein the controller further functions to:
operate the fuel cell power system such that the battery is charged until the charge state of the battery reaches a predetermined upper limit, when the charge state of the battery reaches a predetermined lower limit, and
operate the fuel cell power system in the idle operation state until the charge state of the battery reaches the predetermined lower limit, when the charge state of the battery reaches the predetermined upper limit.

12. The fuel cell vehicle as defined in claim 1, further comprising:
a battery which stores the power generated by the fuel cell power system, and
a sensor which detects a charge state of the battery, wherein the controller further functions to:
operate the fuel cell power system such that the battery is charged until the charge state of the battery reaches a predetermined upper limit, when the charge state of the battery reaches a predetermined lower limit, and
stop the fuel cell power system until the charge state of the battery reaches the predetermined lower limit, when the charge state of the battery reaches the predetermined upper limit.

13. The fuel cell vehicle as defined in claim 1, further comprising:
a battery which stores the power generated by the fuel cell power system, and
a sensor which detects a charge state of the battery, wherein the controller further functions to compensate the predetermined load according to the charge state of the battery.

14. The fuel cell vehicle as defined in claim 1, wherein:
stop state is included in the constant load operation.

15. The fuel cell vehicle as defined in claim 1, further comprising:
a battery which stores the power generated by the fuel cell power system, wherein the controller further functions to:
continuously operate the fuel cell power system such that the operation load of the fuel cell power system is a value obtained by compensating the electrical load demand according to the charge state of the battery, when the electrical load demand is larger than the predetermined load.

16. A fuel cell vehicle, comprising:
a fuel cell power system which generates power using hydrogen and oxygen;
a motor for a vehicle drive which runs by receiving the power supplied from the fuel cell power system;
a battery which stores the power generated by the fuel cell power system;
a sensor which detects a charge state of the battery; and
a controller functioning to:
compute an electrical load demand required for running the vehicle,
operate the fuel cell power system under a constant load regardless of the electrical load demand, when the electrical load demand is smaller than a predetermined load,
operate the fuel cell power system under a load according to the electrical load demand, when the electrical load demand is larger than the predetermined load,
operate the fuel cell power system such that the battery is charged until the charge state of the battery reaches a predetermined upper limit, when the charge state of the battery reaches a predetermined lower limit, and
operate the fuel cell power system in the idle operation state until the charge state of the battery reaches the predetermined lower limit, when the charge state of the battery reaches the predetermined upper limit.

17. A fuel cell vehicle, comprising:
a fuel cell power system which generates power using hydrogen and oxygen;

a motor for a vehicle drive which runs by receiving the power supplied from the fuel cell power system;

a battery which stores the power generated by the fuel cell power system;

a sensor which detects a charge state of the battery, and a controller functioning to:

compute an electrical load demand required for running the vehicle, operate the fuel cell power system under a constant load regardless of the electrical load demand, when the electrical load demand is smaller than a predetermined load, operate the fuel cell power system under a load according to the electrical load demand, when the electrical load demand is larger than the predetermined load, operate the fuel cell power system such that the battery is charged until the charge state of the battery reaches a predetermined upper limit, when the charge state of the battery reaches a predetermined lower limit, and stop the fuel cell power system until the charge state of the battery reaches the predetermined lower limit, when the charge state of the battery reaches the predetermined upper limit.

* * * * *